(12) United States Patent
Chiu et al.

(10) Patent No.: US 12,162,029 B2
(45) Date of Patent: Dec. 10, 2024

(54) SHIELDING JIG

(71) Applicant: GUDENG PRECISION INDUSTRIAL CO., LTD., New Taipei (TW)

(72) Inventors: Ming-Chien Chiu, New Taipei (TW); En-Nien Shen, New Taipei (TW); Yung-Chin Pan, New Taipei (TW); Shih-Feng Wu, New Taipei (TW)

(73) Assignee: GUDENG PRECISION INDUSTRIAL CO., LTD., New Taipei (TW)

( * ) Notice: Subject to any disclaimer, the term of this patent is extended or adjusted under 35 U.S.C. 154(b) by 416 days.

(21) Appl. No.: 17/163,451

(22) Filed: Jan. 31, 2021

(65) Prior Publication Data
US 2022/0080441 A1 Mar. 17, 2022

(30) Foreign Application Priority Data
Sep. 12, 2020 (TW) .................. 109143526

(51) Int. Cl.
*B05B 12/20* (2018.01)
*F16J 15/02* (2006.01)
*F16J 15/06* (2006.01)

(52) U.S. Cl.
CPC ............. *B05B 12/20* (2018.02); *F16J 15/028* (2013.01); *F16J 15/061* (2013.01); *F16J 15/064* (2013.01)

(58) Field of Classification Search
CPC ........ B05B 12/20; F16J 15/028; F16J 15/061; F16J 15/064; H01L 21/673; H01L 21/68

USPC .......................................... 118/504; 427/282
See application file for complete search history.

(56) References Cited

U.S. PATENT DOCUMENTS

| 3,801,234 | A | * | 4/1974 | Love | ...................... | F04B 53/00 |
|  |  |  |  |  |  | 417/454 |
| 4,467,703 | A | * | 8/1984 | Redwine | ............... | F04B 53/162 |
|  |  |  |  |  |  | 417/539 |
| 5,316,320 | A | * | 5/1994 | Breaker | .................. | F16L 23/16 |
|  |  |  |  |  |  | 285/368 |
| 2005/0151329 | A1 | * | 7/2005 | Selby | ....................... | B60J 10/30 |
|  |  |  |  |  |  | 277/605 |
| 2009/0243290 | A1 | * | 10/2009 | Anderson | ............. | F16L 25/026 |
|  |  |  |  |  |  | 285/329 |
| 2015/0020921 | A1 | * | 1/2015 | Sanders | ............... | F01P 11/0276 |
|  |  |  |  |  |  | 285/345 |
| 2015/0292656 | A1 | * | 10/2015 | Kishi | ....................... | F16K 3/30 |
|  |  |  |  |  |  | 285/356 |
| 2016/0138718 | A1 | * | 5/2016 | Lee | ......................... | F16L 23/18 |
|  |  |  |  |  |  | 277/608 |
| 2019/0032685 | A1 | * | 1/2019 | Foster | ..................... | F04B 1/053 |

(Continued)

FOREIGN PATENT DOCUMENTS

TW M392824 U1 11/2010

*Primary Examiner* — Logan M Kraft
*Assistant Examiner* — Johnny H Hoang
(74) *Attorney, Agent, or Firm* — Cheng-Ju Chiang

(57) ABSTRACT

The present invention discloses a shielding jig which mainly comprises an adjustment unit, a positioning unit and a sealing unit. The adjustment unit is configured and engaged between the positioning unit and the sealing unit. Therefore, a first actuation surface of the adjustment unit matches with a second actuation surface of the sealing unit, resulting in expansion of the sealing unit. This expansion makes the shielding jig be able to shade and seal any workpiece.

8 Claims, 7 Drawing Sheets

(56) References Cited

U.S. PATENT DOCUMENTS

| | | | |
|---|---|---|---|
| 2019/0178421 A1* | 6/2019 | Treloar | F22B 37/105 |
| 2019/0285177 A1* | 9/2019 | Sakane | F16J 15/061 |
| 2020/0386315 A1* | 12/2020 | Hagiwara | F16J 15/3204 |
| 2021/0003218 A1* | 1/2021 | Lee | F16J 15/122 |
| 2021/0246804 A1* | 8/2021 | Sunnarborg | F16J 15/028 |
| 2022/0282720 A1* | 9/2022 | Foster | F04B 39/121 |

* cited by examiner

SHIELDING JIG

TECHNICAL FIELD

The present invention relates to a kind of shielding jig, especially a shielding jig that could offer the shielding effect of workpieces such as tubular objects, concerning to surface treatment via special sealing means (tight).

BACKGROUND OF RELATED ARTS

In electrochemical process, anodizing is a fairly common method. Generally, considering the surface treatment for the anode, there are two ways to treat the non-treated area. First of all, some of the measures for the non-treated area are to perform anodizing on the entire workpiece, and then perform surface treatments such as chipping or grinding in the non-treated area to remove the surface after the previous anodizing to obtain the final product. Another way is to use masking tools such as chemical gels, tapes or jigs to completely/partially mask the non-processed areas of the workpiece, and then send them to the electrochemical cell for reactions such as anodizing. In this way, the masked part does not require secondary processing such as cutting or grinding as in the previous method to obtain the final product.

However, when chemical gel or tape is used, the processing steps after the reaction are complicated. In addition, there may be problems with residual glue, which may cause a decrease in product yield. As for the jigs, most of the existing jigs use O-rings for sealing and shielding, but there are many shortcomings in the design of the O-ring, including thermal expansion and contraction caused by the temperature difference, which makes it not 100% perfect for sealing and shielding. Once there is an incomplete seal, it will also cause the risk of electrochemical solution infiltration, which will reduce the yield of the product.

In general life technology applications, the demand for non-precision anode treatment is still common. However, in some industries with high-precision requirements, such as semiconductors and aerospace industries, the equipment or equipment parts have high-precision requirements. Therefore, the existing methods and jigs could no longer meet the processing and application requirements of these high-precision industries. At present, there is an urgent need for a shielding jig with an extremely high-precision sealing effect that is convenient to install and remove and can resist the influence of various environmental factors.

SUMMARY

The present invention is to solve the problem of the prior arts. Accordingly, the present invention provides a shielding jig mainly comprising at least one positioning unit, at least one adjustment unit and at least one sealing unit. The at least one adjustment unit is fixed by the at least one positioning unit and the at least one sealing unit together. In addition, a first actuation surface is configured on the at least one adjustment unit, mating with a second actuation surface configured on the sealing unit and resulting in expansion of the sealing unit.

Embodiments of the invention are illustrated by way of example, and not by way of limitation, in the figures of the accompanying drawings in which like reference numerals refer to similar elements.

DETAILED DESCRIPTION OF THE INVENTION

In order to understand the technical features and practical efficacy of the present invention and to implement it in accordance with the contents of the specification, hereinafter, preferred embodiments of the present invention will be described in detail with reference to the accompanying drawings.

Figure 1:
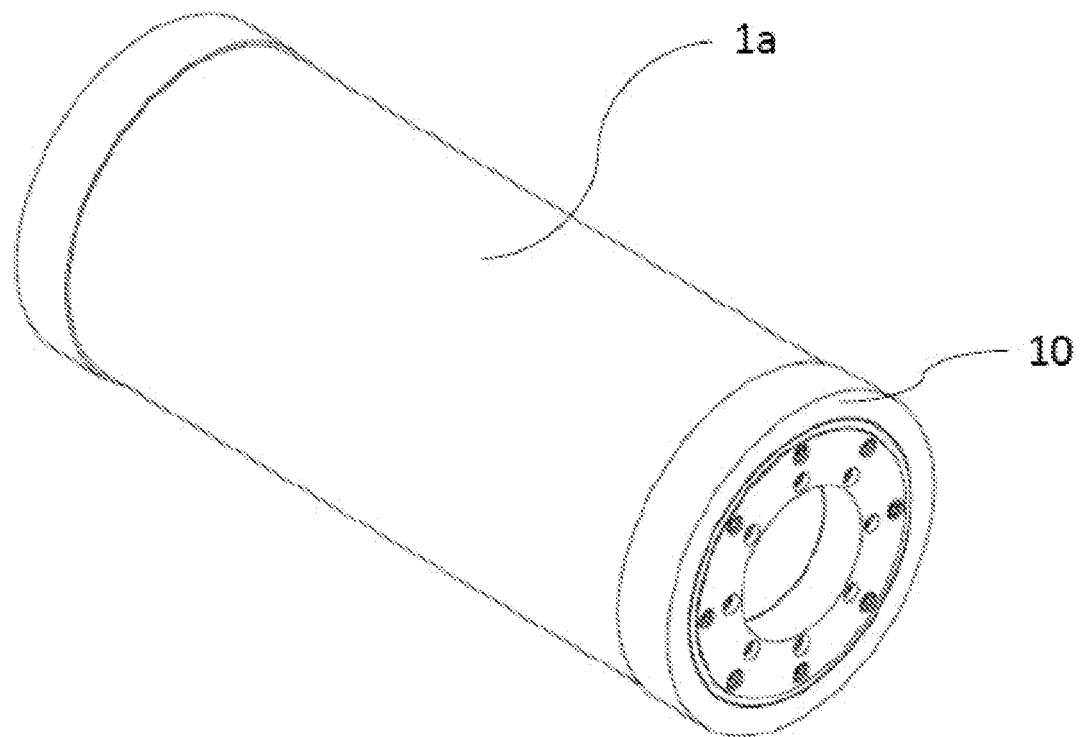
FIG. 1 illustrates a schematic diagram of the shielding jig of an embodiment of the present invention.

Please refer to FIG. 1. FIG. 1 is a schematic diagram of the shielding jig of an embodiment of the present invention. As shown in FIG. 1, the embodiment mainly comprises a workpiece 1a and a shielding jig 10. The shielding jigs 10 are configured on two sides of the workpiece 1a.

Figure 3:
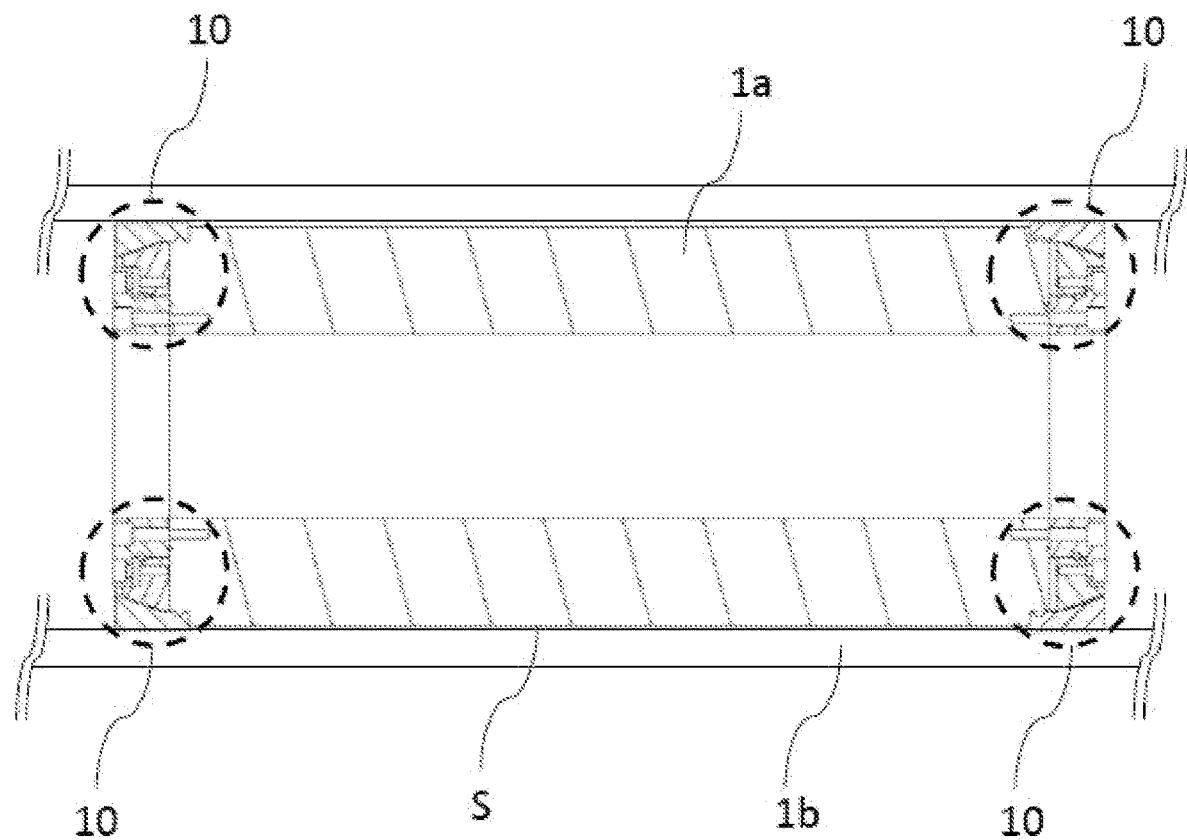
FIG. 3 illustrates a schematic diagram of the practical application of the shielding jig of an embodiment of the present invention.

In the embodiment shown in FIG. 1, said shielding jigs 10 are used as masking the surface of the workpiece 1a. In other possible embodiments, the shielding jigs 10 are also used in other to-be-processed object with different pipe diameters, such as workpiece 1b. To be more specific, please refer to FIG. 3, FIG. 3 is a usage schematic diagram of the shielding jig of an embodiment of the present invention. As shown in FIG. 3, the workpiece 1a of this embodiment is a tubular structure, and can extend into the inner wall of the to-be-processed tubular workpiece (i.e., the workpiece 1b in FIG. 3). After the shielding jig 10 exerts its sealing effect, a shielding area S is formed in order to provide the double shielding effect of simultaneously shielding the outer surface of the workpiece 1a and the inner surface of the workpiece 1b.

Figure 2:
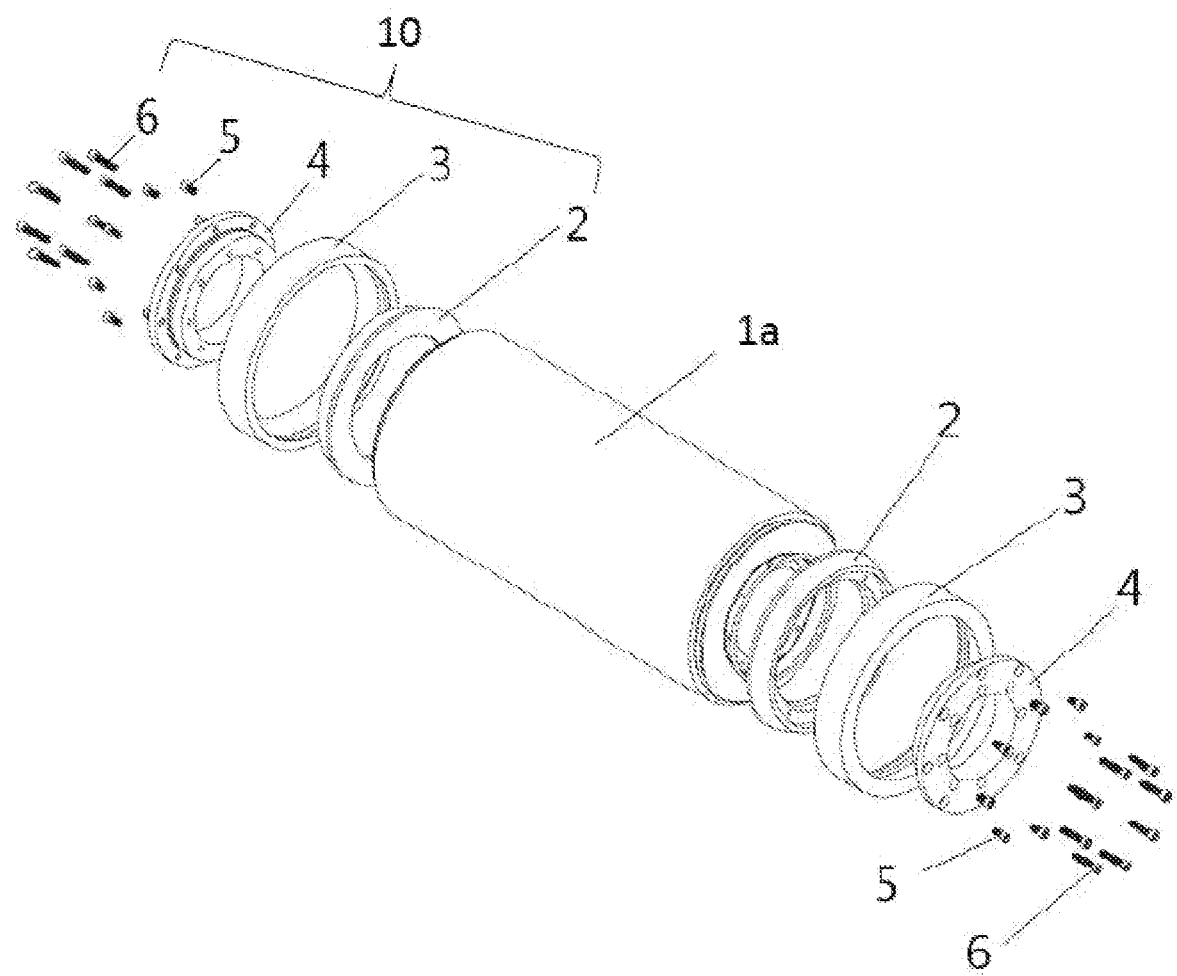
FIG. 2 illustrates an exploded view of the shielding jig of the embodiment of the present invention.
Figure 4:
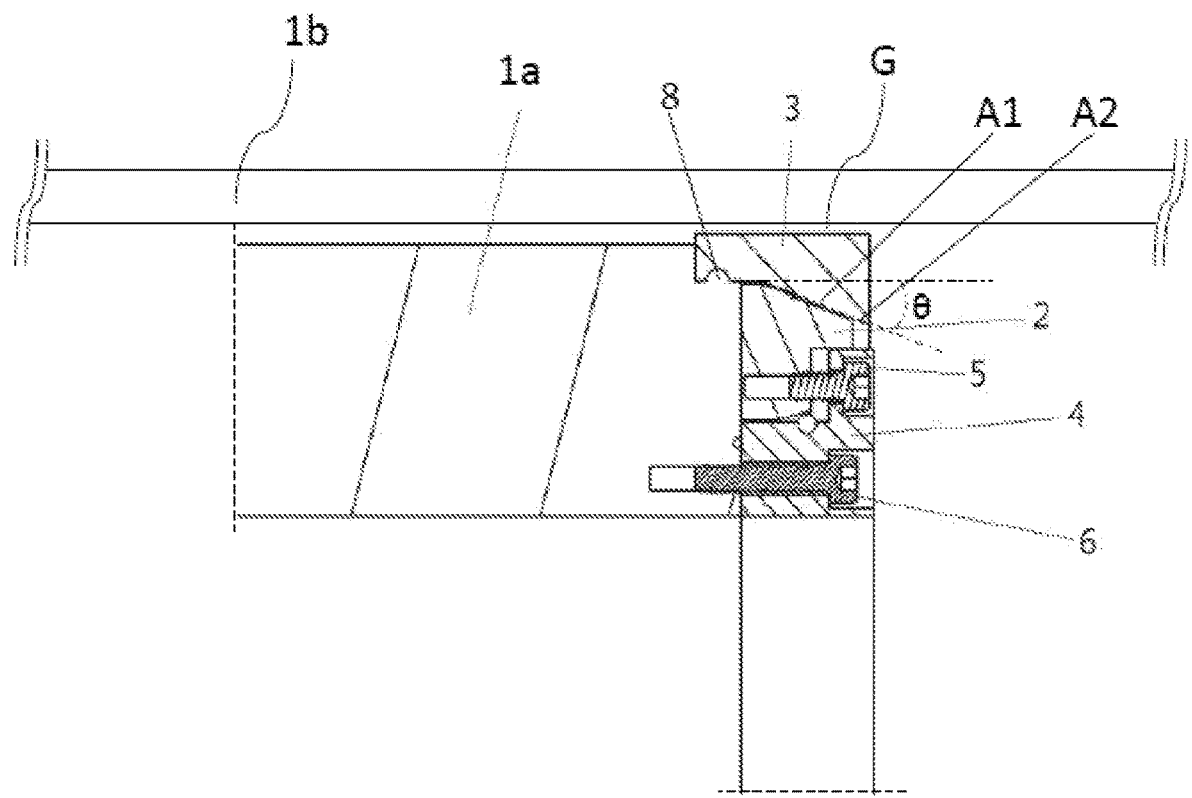
FIG. 4 shows a diagram of the practical application of the shielding jig of the embodiment of the present invention.
Figure 5:
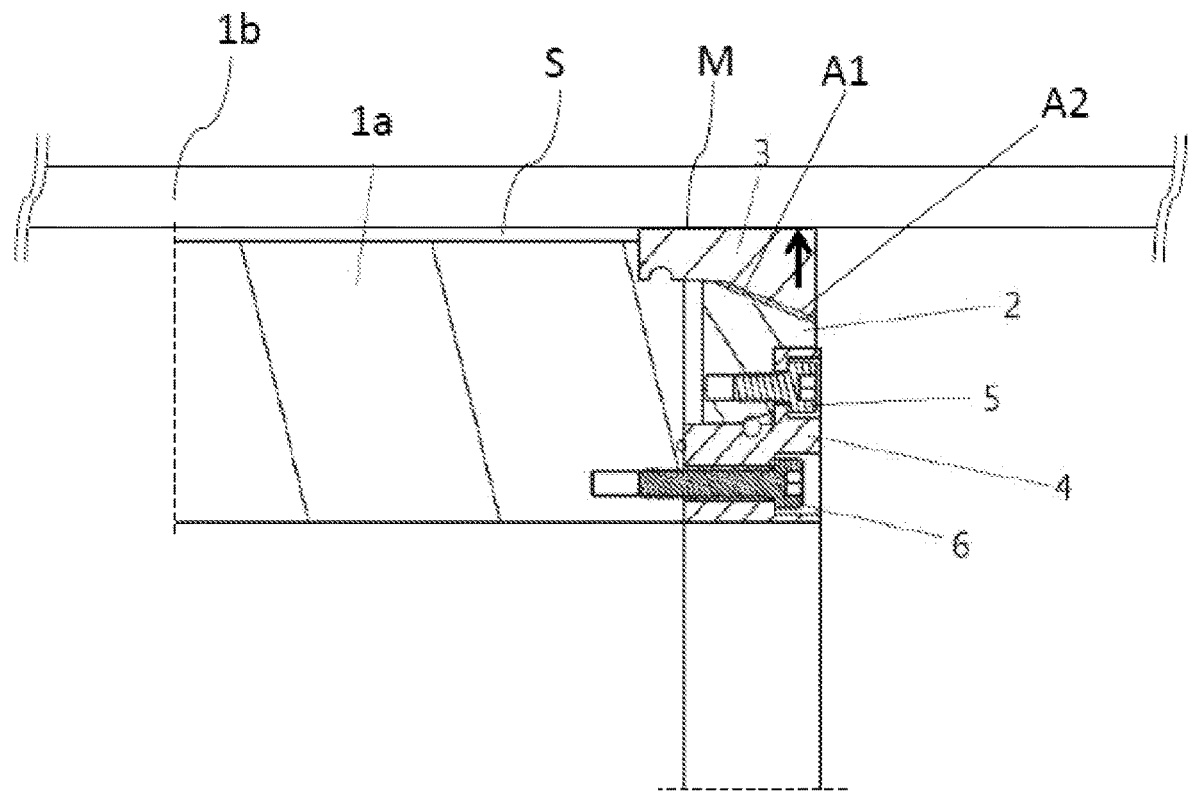
FIG. 5 illustrates the other diagram of the practical application of shielding jig of the embodiment of the present invention.

Please refer to FIG. 2 and FIG. 4-5, FIG. 2 is an exploded view of the shielding jig 10 of the embodiment of the present invention. FIG. 4 is a diagram of the practical application of the shielding jig 10 of the embodiment of the present invention. FIG. 5 illustrates the other diagram of the practical application of the shielding jig 10 of the embodiment of the present invention.

The dismantled structure of the shielding jig 10 in FIG. 1 is clearly shown in FIG. 2. In the embodiment, each of the shielding jigs 10 mainly comprises three units, which are the positioning unit 4, the adjustment unit 2 and the sealing unit 3.

The adjustment unit 2 is clamped and fixed by the positioning unit 4 and the sealing unit 3. In addition, the adjustment unit 2 is provided with a first actuation surface A1 (refer to FIG. 4), and the first actuation surface A1 mates with a second actuation surface A2 configured on the sealing unit 3 (refer to FIG. 4), resulting in the expansion of the sealing unit. In short, the first actuation surface A1 on the adjustment element 2 and the second actuation surface A2 on the sealing element 3 are in contact with each other under normal use condition. In addition, one end of the sealing element 3 of this embodiment is fixed on the workpiece 1 through the fixing point 8.

Specifically, the positioning unit 4, the adjustment unit 2 and the sealing unit 3 of this embodiment are all ring-shaped structures, which can be sleeved on both ends of the workpiece 1*a* and be penetrated through the first fastener 5 and the second fastener 6. The entire abovementioned structure is the shielding jig 10. In this embodiment, a plurality of screws can be used as the first fastener 5 and the second fastener 6, and it is not intended to be exhaustive or to be limited to the precise forms disclosed.

The positioning unit 4 of this embodiment is fastened to the workpiece 1*a* via the second fasteners 6 penetrating through the positioning unit 4, and the movements of the positioning unit 4 is restricted by the second fasteners 6. Therefore, in this embodiment, the positioning unit 4 is not a unit that can move arbitrarily.

The first fasteners 5 penetrate part of the positioning unit 4 and then penetrates into the adjustment unit 2 (refer to FIG. 4). Since the adjustment unit 2 is only physically connected with the first fasteners 5, the adjustment element 2 can be adjusted to move left and right along the axial direction of the workpiece 1*a* by rotating the first fasteners 5.

Therefore, as shown in FIG. 4, when the first fastener 5 is not rotated, the adjustment element 2 will not move. Next, as shown in FIG. 5, when the first fastener 5 is rotated, the first actuation surface A1 on the adjustment unit 2 will move together with the adjustment unit 2, and it will be aligned with the second actuation surface A2 on the sealing element 3 to cooperate with each other.

When the first actuation surface A1 mates with the second actuation surface A2, the pressure from the first actuation surface A1 will cause the slope formed with the second actuation surface A2 and the first actuation surface A1 to slide and the two surfaces to collide within. The pushing effect makes the sealing unit 3 expand along the direction as the manner shown in the direction by the thick arrow in FIG. 5 (radial direction of the workpiece 1*a*). In this embodiment, as shown by the broken line in FIG. 4, the inclined plane co-constructed by the second actuation surface A2 and the first actuation surface A1 has an angle θ between 12 degrees and 35 degrees. In fact, in other possible embodiments, the angle of the inclined plane θ can thus be adjusted according to requirements, and it is not limited within the scope of the present invention.

In this way, the above could clarify that there is still a gap G between the shielding jig 10 and the workpiece 1*b* when the first fixing member 5 of FIG. 4 has not been rotated; and after the first fastener 5 is rotated, the gap G becomes a sealing surface M, and then the shielding area S. At the same time, since one end of the sealing unit 3 is fixed on the workpiece 1 through the fixing point 8, when the first actuation surface A1 and the second actuation surface A2 resist the oppression of each other, the sealing unit 3 would expand and press the inner tube wall of the workpiece 1*b* with the surface contacting. Due to the result of surface contact, its sealing effect is much higher than that in traditional technology, which is a line contact O-ring.

In this embodiment, the material of the sealing unit 3 could be selected from silicon rubber, rubber or a combination thereof. Among them, the rubber is preferably fluorinated rubber. Therefore, since the sealing unit 3 of this embodiment is made of an elastic material, when it is expanded, it can be more closely attached to the inner tube wall of the workpiece 1*b*. The small amount of deformation makes the sealing surface M of this embodiment more effective, preventing the penetration of electrochemical solution, which further affects the workpiece 1*a* and the workpiece 1*b*.

Since this embodiment needs to adjust the expansion degree of the sealing unit 3 through the mutual cooperation between the first fastener 5 and the second fastener 6, how to uniformly expand the sealing element 3 and gain a uniform expansion sealing effect brings about the problem of the embodiment remains to be solved.

In this embodiment, there are eight groups of the first fastener 5 and the second fastener 6. Under the premise that the fixing effect on the second fastener 6 is the same and the distribution position is even (that is, the distances between each first fastener 5 and each second fastener 6 are equal), this embodiment mainly determines whether the sealing unit 3 expands uniformly and obtains uniform sealing effect by testing whether the torsion value of each first fixing part 5 is nearly the same. Furthermore, the first fastener 5 in this embodiment can be adjusted by a specific adjustment tool to adjust the uniformity of its rotation. For example, the adjustment tool can be a screwdriver with a coaxial/multi-axis simultaneous motion effect to ensure that the rotation amplitude of each first fastener 5 is equal, so that the sealing unit 3 can expand evenly.

Figure 6:
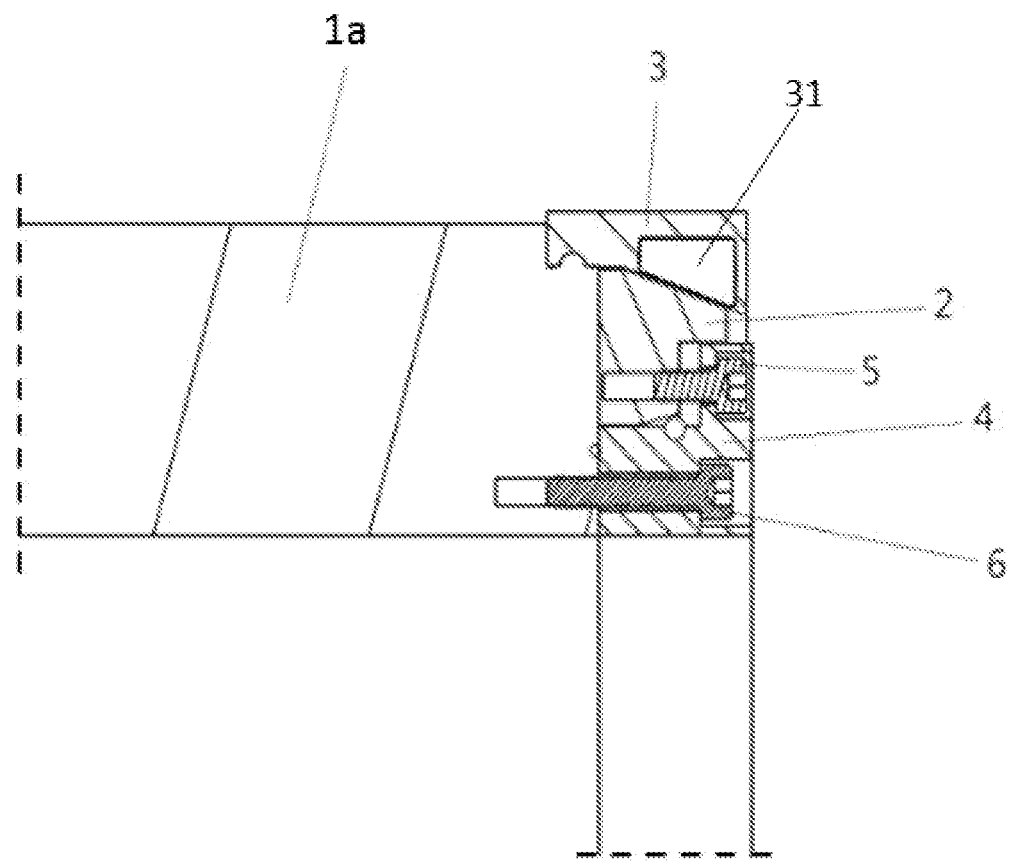
FIG. 6 illustrates a schematic diagram of the shielding jig of the other embodiment of the present invention.

Please refer to FIG. 6, FIG. 6 is a structural diagram of another shielding jig 10 according to the embodiment of the present invention. In the embodiment of FIG. 6, the sealing unit 3 is additionally configured with a ring-shaped or continuous block-shaped stress transfer unit 31 near the second actuation surface A2 in FIG. 4 to FIG. 5. In the embodiment of FIG. 6, the stress transfer unit 31 must have different physical properties from the sealing unit 3.

In fact, the stress transfer performs better when the deformation amount is small. Therefore, the stress transfer unit 31 embedded in the sealing unit 3 of this embodiment can be selected from a relatively hard material like metal or ceramic. In addition, considering the friction between the hard material and the adjustment unit 2, if necessary, either the first actuation surface A1 on the adjustment element 2 or the stress transfer unit 31 can be coated with Teflon material to reduce the friction resistance.

In the embodiment of FIG. 6, the design of the stress transfer unit 31 ensures that the displacement of the adjustment unit 2 is transmitted and leads to the expansion of the sealing unit 3, so that the expansion range of the sealing unit 3 is increased to meet higher sealing requirements.

Figure 7:
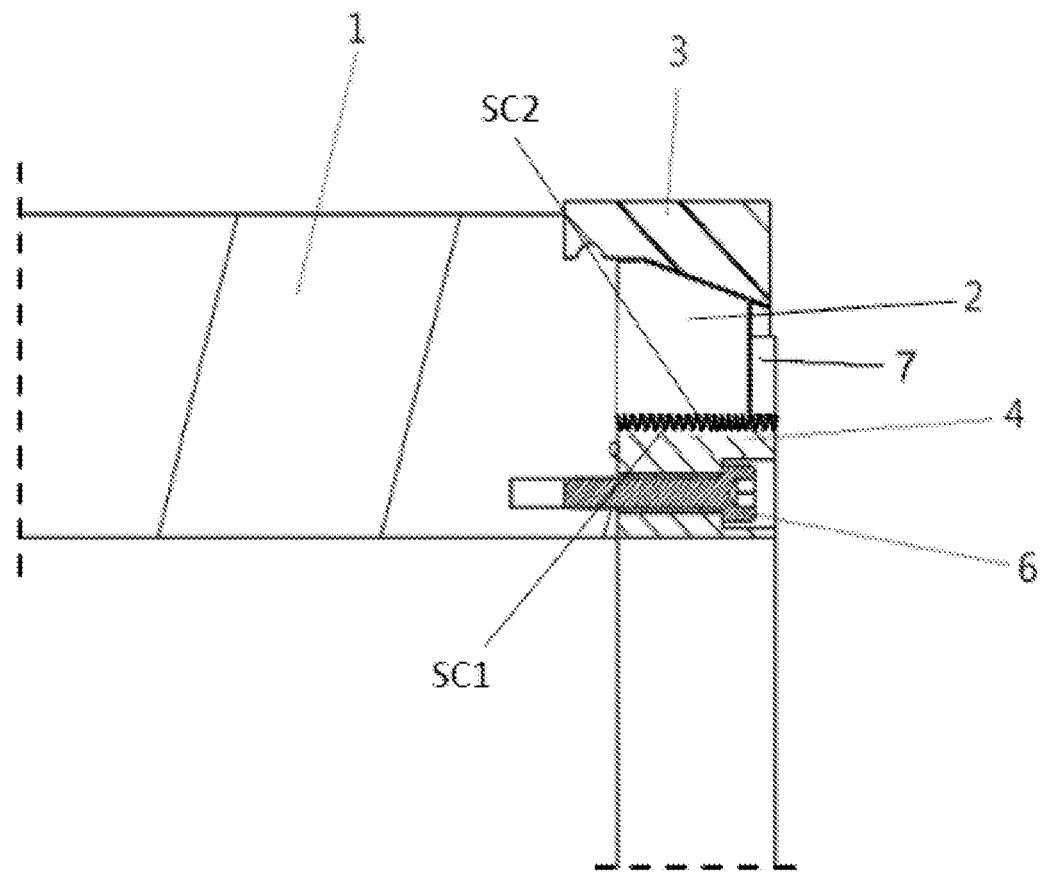
FIG. 7 illustrates a schematic diagram of the shielding jig of the other embodiment of the present invention.

Please refer to the next FIG. 7, which is a schematic structural view of another shielding jig 10 according to the embodiment of the present invention. In the embodiment of FIG. 7, different from the embodiment of FIG. 1 to FIG. 6, the first fasteners 5 are not used to adjust the displacement of the adjustment unit 2. In the embodiment of FIG. 7, the positioning unit 4 is further configured with a first thread SC1, and the adjustment unit 2 is further configured with a second thread SC2. Therefore, the first thread SC1 cooperates with the rotation of the second thread SC2 to drive the displacement of the first actuation surface A1 to obtain the effect of expanding the sealing unit 3.

Specifically, in the embodiment of FIG. 7, the object of rotation is changed to the entire adjustment unit 2. In addition, the adjustment unit 2 rotates on the rotation center (rotation axis) with the positioning unit 4 holding within. In the embodiment of FIG. 7, since the adjustment unit 2 is rotated and displaced as a whole, there is no concern about the expansion uniformity of the sealing unit 3.

However, since the adjustment unit 2 in the embodiment of FIG. 7 is a ring structure with a large radius of rotation, it will cause a problem that it is difficult to rotate, and an additional auxiliary rotation system is generally required to assist its rotation.

Therefore, in this embodiment, the adjusting unit 2 is further configured with an engaging unit 7. The engaging unit 7 referred to in this embodiment can be any designed bump, groove or even a powerful magnet, etc. In other words, anything that can make the human hand easier to rotate or make it easier for other adjustment tools to be fixed or joined to, or even those that are supplemented by electromechanical rotation such as a motor should all be read on the scope of the present invention.

Although the workpiece 1a and the workpiece 1b are used in this embodiment to demonstrate the effect of the masking jig 10, it does not mean that the masking jig 10 can only be applied in this way in the electrochemical processing process. In fact, the shielding jig 10 should be able to shield the outer surface or the inner surface of any workpiece, depending on the requirements of the electrochemical process, and the invention is not limited.

The ordinal numbers used in the detailed description and claims, such as "first" and "second" do not necessarily indicate their priority orders or up and down directions; on the contrary, they are merely intended to distinguish different elements. It will be apparent to those skilled in the art that various modifications and variations can be made to the structure of the present invention without departing from the scope or spirit of the invention. In view of the foregoing, it is intended that the present invention covers modifications and variations of this invention, provided they fall within the scope of the following claims.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What is claimed is:

1. A shielding jig, comprising:
   at least one positioning unit;
   at least one adjustment unit, matched with the at least one positioning unit; and
   at least one sealing unit, matched with the at least one adjustment unit;
   wherein the at least one adjustment unit has a first actuation surface, mating with a second actuation surface which is formed on the at least one sealing unit and the first actuation surface is forced to shift by the adjustment unit via at least one first fastener set on the at least one positioning unit, resulting in expansion of the sealing unit;
   wherein the first actuation surface and the second actuation surface are integrated into a slope.

2. The shielding jig as claimed in claim 1, wherein the at least one positioning unit is installed on a workpiece via at least one second fastener.

3. The shielding jig as claimed in claim 1, wherein an adjustment tool is a screwdriver with coaxial or multi-axis simultaneous motion effect, and rotation amplitude of each of the at least one first fastener is equal.

4. The shielding jig as claimed in claim 1, wherein a stress transfer unit is configured to be formed at the second actuation surface.

5. The shielding jig as claimed in claim 1, wherein the positioning unit has a first screw thread, the adjustment unit has a second screw thread, the first actuation surface is forced to shift as the first screw thread mating with the second screw thread.

6. The shielding jig as claimed in claim 5, wherein the adjustment unit has at least one engaging unit.

7. The shielding jig as claimed in claim 1, wherein the material of the sealing unit consists of silica gel, rubber or the combination thereof.

8. The shielding jig as claimed in claim 7, wherein the rubber is fluorinated rubber.

\* \* \* \* \*